US010731568B2

(12) United States Patent
Findlay et al.

(10) Patent No.: US 10,731,568 B2
(45) Date of Patent: Aug. 4, 2020

(54) SYSTEMS AND METHODS FOR REDUCING AIRFLOW IMBALANCES IN TURBINES

(71) Applicant: General Electric Company, Schenectady, NY (US)

(72) Inventors: Chad Ernest Findlay, Pacific Grove, CA (US); Ampili Kishore Kumar, Bangalore (IN); Sal Albert Leone, Glenville, NY (US)

(73) Assignee: General Electric Company, Schenectady, NY (US)

( * ) Notice: Subject to any disclaimer, the term of this patent is extended or adjusted under 35 U.S.C. 154(b) by 701 days.

(21) Appl. No.: 15/360,157

(22) Filed: Nov. 23, 2016

(65) Prior Publication Data

US 2018/0142625 A1    May 24, 2018

(51) Int. Cl.
| | |
|---|---|
| *F02C 9/18* | (2006.01) |
| *F02K 3/075* | (2006.01) |
| *F02C 9/28* | (2006.01) |
| *F02C 6/08* | (2006.01) |
| *G05B 23/02* | (2006.01) |
| *F02C 3/13* | (2006.01) |
| *F02C 7/18* | (2006.01) |

(52) U.S. Cl.
CPC ............... *F02C 9/18* (2013.01); *F02C 3/13* (2013.01); *F02C 6/08* (2013.01); *F02C 7/18* (2013.01); *F02C 9/28* (2013.01); *F02K 3/075* (2013.01); *G05B 23/0235* (2013.01); *G05B 23/0237* (2013.01); *F05D 2260/80* (2013.01); *F05D 2270/305* (2013.01); *F15B 2211/2654* (2013.01); *Y02E 20/16* (2013.01); *Y10T 137/87314* (2015.04)

(58) Field of Classification Search
CPC ...... F02C 6/08; F02C 9/18; Y10T 137/87314; F16K 17/003
See application file for complete search history.

(56) References Cited

U.S. PATENT DOCUMENTS

| | | | | |
|---|---|---|---|---|
| 4,313,465 A | * | 2/1982 | Holzem | G05B 11/18 137/599.07 |
| 4,671,318 A | * | 6/1987 | Benson | B64D 13/00 137/486 |
| 5,155,991 A | * | 10/1992 | Bruun | B64D 13/04 454/74 |
| 5,325,884 A | * | 7/1994 | Mirel | G05D 7/0652 137/110 |
| 6,921,244 B2 | * | 7/2005 | Johnson | F01D 17/08 415/144 |
| 7,077,148 B2 | | 7/2006 | Schnell et al. | |
| 7,784,288 B2 | | 8/2010 | Thatcher et al. | |
| (Continued) | | | | |

FOREIGN PATENT DOCUMENTS

WO    2002086327 A1    10/2002

*Primary Examiner* — Gerald L Sung
*Assistant Examiner* — Marc J Amar
(74) *Attorney, Agent, or Firm* — Fletcher Yoder, P.C.

(57) ABSTRACT

A turbine system may include several air lines that extend from a compressor to a turbine, and the air lines may have valves. Additionally, the turbine system may also include several sensors that are coupled to the valves, several actuators that are coupled to the valves, and a controller that can send a command to set a valve position of one of the valves based at least partially on a valve position of another valve.

20 Claims, 3 Drawing Sheets

(56) References Cited

U.S. PATENT DOCUMENTS

| | | | |
|---|---|---|---|
| 8,240,153 B2 | 8/2012 | Childers et al. | |
| 8,267,639 B2 | 9/2012 | Henahan | |
| 8,677,761 B2* | 3/2014 | Leach | F02C 9/18 |
| | | | 60/39.091 |
| 9,003,762 B2* | 4/2015 | Scipio | F01D 25/30 |
| | | | 60/39.5 |
| 10,436,073 B2* | 10/2019 | Scipio | F02C 7/141 |
| 2003/0129052 A1* | 7/2003 | Johnson | F01D 17/08 |
| | | | 415/26 |
| 2004/0250861 A1* | 12/2004 | Schnell | F16K 37/0083 |
| | | | 137/599.08 |
| 2005/0086939 A1* | 4/2005 | Schmid | F01D 13/003 |
| | | | 60/726 |
| 2005/0087238 A1* | 4/2005 | Wilson | G05D 16/204 |
| | | | 137/599.07 |
| 2010/0037777 A1* | 2/2010 | Davis | B01D 53/30 |
| | | | 96/228 |
| 2010/0286889 A1* | 11/2010 | Childers | F02C 6/08 |
| | | | 701/100 |
| 2013/0180260 A1* | 7/2013 | Romig | F02C 7/262 |
| | | | 60/776 |
| 2014/0090354 A1* | 4/2014 | Scipio | F01D 25/30 |
| | | | 60/39.5 |
| 2014/0090395 A1* | 4/2014 | Appukuttan | F02C 7/185 |
| | | | 60/776 |
| 2015/0354464 A1* | 12/2015 | Hillel | F02C 3/04 |
| | | | 415/1 |
| 2017/0061295 A1* | 3/2017 | Horabin | G06N 5/04 |

* cited by examiner

SYSTEMS AND METHODS FOR REDUCING AIRFLOW IMBALANCES IN TURBINES

BACKGROUND OF THE INVENTION

The subject matter disclosed herein relates to turbine systems, and more specifically, to systems and methods for reducing airflow imbalances between air lines that are part of turbine systems.

Air lines are used to transfer an oxidant, such as compressed air, from one part of a turbine system to another. In some turbine systems, one or more air lines may be utilized to send compressed air from a compressor section to a turbine section of the turbine system. In such turbine systems more than one air line may be used to couple the compressor to the turbine. When using more than one air line, various systems and methods may be employed to control the airflow within the air lines of turbine systems.

BRIEF DESCRIPTION OF THE INVENTION

Certain embodiments commensurate in scope with the originally claimed embodiments are summarized below. These embodiments are not intended to limit the scope of the claims, but rather these embodiments are intended only to provide a brief summary of possible forms of the presently disclosed systems and techniques. Indeed, the presently disclosed systems and techniques may encompass a variety of forms that may be similar to or different from the embodiments set forth below.

In one embodiment, a turbine system may include several air lines that extend from a compressor to a turbine, and the air lines may have valves. Additionally, the turbine system may also include several sensors that are coupled to the valves, several actuators that are coupled to the valves, and a controller that can send a command to set a valve position of one of the valves based at least partially on a valve position of another valve.

In another embodiment, a non-transitory machine readable medium, includes computer executable instructions configured to cause a processor to determine a target valve position of a valve based at least partially on a valve position of another valve. The valves are coupled to air lines that extend between a compressor and a turbine. Additionally, the non-transitory machine readable medium may include computer executable instructions configured to cause a processor to send a command to an actuator associated with one of the valves to set a valve position of that valve to its target valve position.

In yet another embodiment, a method may include determining, via a processor, target valve positions of valves associated with more than one air line, sending, via the processor, a command to actuators associated with the valves to set the valves to their target valve positions, and receiving, via the processor, feedback from sensors associated with the plurality of valves regarding the valve positions of the valves. The method may further include determining, via the processor, whether the valve positions of the valves are within target valve position thresholds based on the feedback. The method may also include sending, via the processor, a command to the plurality of actuators to set the valve positions of one of the valves to another valve position based at least partially on the valve position of another valve.

BRIEF DESCRIPTION OF THE DRAWINGS

These and other features, aspects, and advantages of the presently disclosed systems and techniques will become better understood when the following detailed description is read with reference to the accompanying drawings in which like characters represent like parts throughout the drawings, wherein.

DETAILED DESCRIPTION OF THE INVENTION

One or more specific embodiments of the presently disclosed systems and techniques will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the presently disclosed systems and techniques, the articles "a," "an," "the," and "said" are intended to mean that there are one or more of the elements. The terms "comprising," "including," and "having" are intended to be inclusive and mean that there may be additional elements other than the listed elements.

The present disclosure is generally directed to systems and methods for controlling and reducing an airflow imbalance between at least two air lines that couple a compressor of a turbine system to a turbine or a turbine system. For example, a turbine system may include a compressor, a turbine, two air lines extending from the compressor to the turbine, and a valve positioned on each air line. If an imbalance in the amount of air flowing through each air line into the turbine is detected, values used to control airflow through each air line may be adjusted to reduce the imbalance. For instance, two valves that are positioned on two respective air lines may initially be set to the same valve position so that the same or a similar amount of air enters the turbine via each air line. In the event of an imbalance in the airflow that passes through each valve into the turbine, the systems and methods in the present disclosure can be used to control and reduce such an imbalance by adjusting the positions of the two valves.

Figure 1:
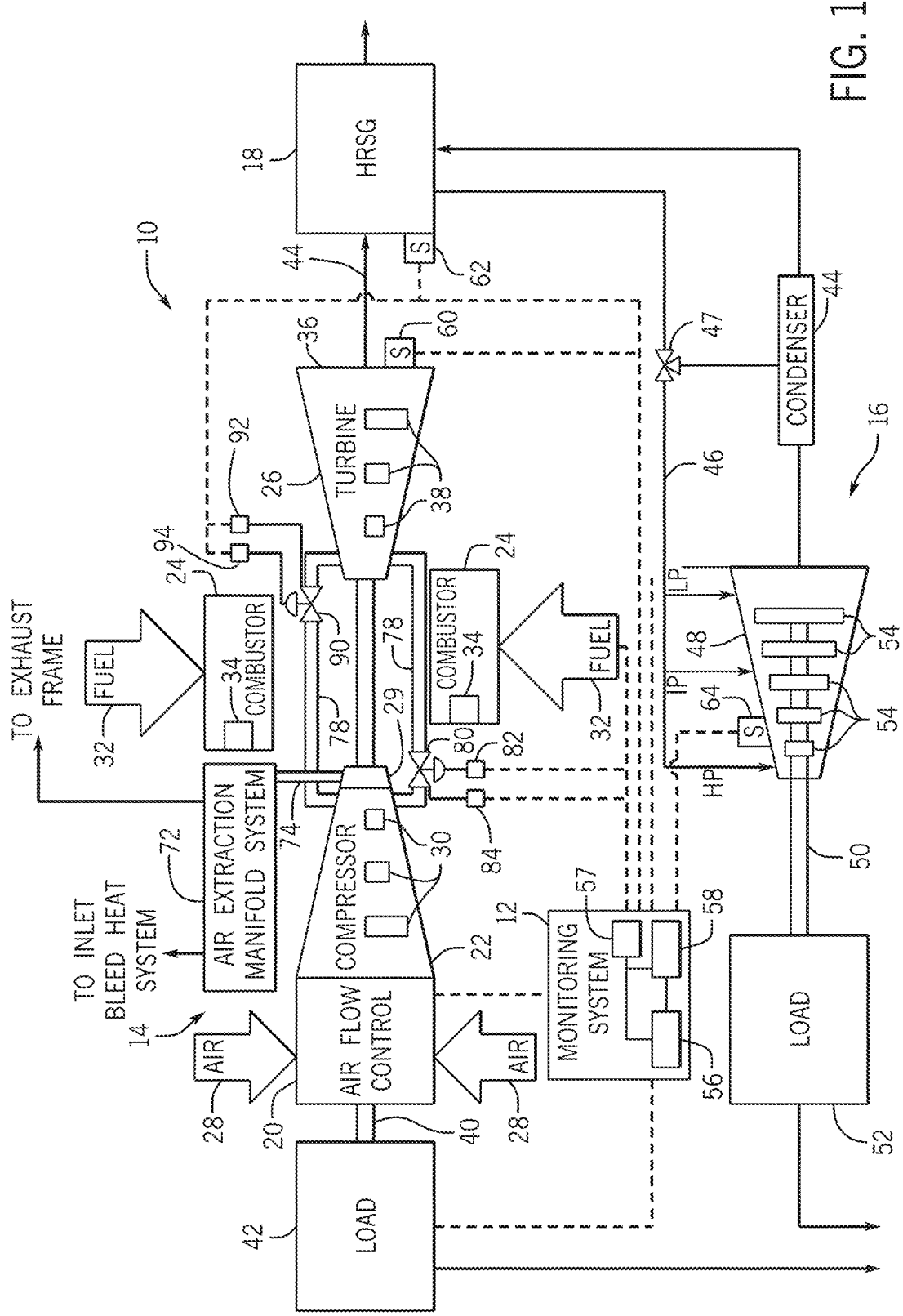
FIG. 1 is a block diagram of an example combined cycle power plant, in accordance with embodiments described herein.

By way of introduction, FIG. 1 is a block diagram of an embodiment of a combined cycle power plant 10 with a controller 12 that may control the valve positions of valves. As shown in FIG. 1, the combined cycle power plant (CCPP) 10 includes the controller 12, gas turbine system 14, the steam turbine system 16, and a heat recovery steam generator (HRSG) 18. In operation, the gas turbine system 14 combusts a fuel-air mixture to create torque that drives a load, e.g., an electrical generator. In order to reduce energy waste, the combined cycle power plant 10 uses the thermal energy in the exhaust gases to heat a fluid and create steam in the HRSG 18. The steam travels from the HRSG 18 through a steam turbine system 16 creating torque that drives a load, e.g., an electrical generator. Accordingly, the CCPP 10 combines the gas turbine system 14 with steam turbine system 16 to increase power production while reducing energy waste (e.g., thermal energy in the exhaust gas).

The gas turbine system 14 includes an airflow control module 20, compressor 22, combustor 24, and turbine 26. In operation, an oxidant 28 (e.g., air, oxygen, oxygen enriched air, or oxygen reduced air) enters the turbine system 14 through the airflow control module 20, which controls the amount of oxidant flow (e.g., airflow). The airflow control module 20 may control airflow by heating the oxidant flow, cooling the oxidant flow, extracting airflow from the compressor 22, using an inlet restriction, using an inlet guide vane, or a combination thereof. As the air 28 passes through the airflow control module 20, the air 28 enters the compressor 22. The compressor 22 pressurizes the air 28 in a series of compressor stages (e.g., rotor disks 30) with compressor blades. After the air 28 is pressurized, the pressurized air may reside in a compressor discharge chamber 29 before the compressed air exits the compressor 22. The compressed air may exit the compressor 22 via air lines 78 or the combustor 24.

Referring to compressed air that exits the compressor 22 and enters into the air lines 78, the compressed air later enters the turbine 26 via the air lines 78. In other words, the air lines 78 extend from the compressor 22 to the turbine 26, and compressed air passes from the compressor 22 to the turbine 26 via the air lines 78. It should also be noted that while the present discussion indicates that compressed air passes through the air lines 78 (i.e., the oxidant is air), other compressed oxidants (e.g., compressed oxygen, compressed oxygen enriched air, compressed oxygen reduced air, etc.) may also pass through the air lines 78. Before entering into the turbine 26, the compressed air also passes through valves 80 and 90. The valves 80 and 90 may be opened or closed to control the amount of air that flows through the air lines 78 into the turbine 26 as well as the rate at which the air flows. For instance, the valves 80 and 90 could be completely open and therefore allow all of the air 28 that enters the air lines 78 from the compressor 22 to subsequently pass through the valves into the turbine 26 without any impedance due to the valves 80 and 90. The valves 80 and 90 could also be completely closed. In such a case, none of the air 28 would enter the turbine 26. However, the valves 80 and 90 could be positioned between completely open and completely closed. As a result, the air 28 would flow through the air lines 78 into the turbine 26 but at a slower rate compared to when the valves 80 and 90 are completely open.

The sensors 82 and 92 may detect the valve positions of the valves 80 and 90, the amount of the air 28 that flows through the air lines 78, the rate at which the air 28 flows through the air lines 78, the pressure of the air 28 within the air lines 78, and the like. The sensors 82 and 92 may also transmit data to the controller 12. The actuators 84 and 94 may adjust the valve positions of the valves 80 and 90. For example, the actuators 84 and 94 may include motors that are configured to physically change the valve positions. Also, the actuators 84 and 94 may be many types of actuators, such as, but not limited to hydraulic actuators, pneumatic actuators, and/or spring actuators. The actuators 84 and 94 may also adjust the valve positions of the valves 80 or 90 in response to a command from the controller 12.

Additionally, the valves 80 and 90 may be coupled to the sensors 82 and 92, respectively, as well as actuators 84 and 94, respectively. The sensors 82 and 92 and the actuators 84 and 94 may be communicatively coupled to the controller 12 and may be used to detect and control airflow via the air lines 78. Additional details with regard to how the controller 12 may control the valves 80 and 90 of the air lines 78 is provided below with reference to FIGS. 2-3

Referring to compressed air that exits the compressor 22 and enters the combustor 24, the compressed air is mixed with fuel 32 after entering the combustor. The turbine system 14 may use liquid or gas fuel, such as natural gas and/or a hydrogen rich synthetic gas, to run the turbine system 14. For example, the fuel nozzles 34 may inject a fuel-air mixture into the combustor 24 in a suitable ratio for optimal combustion, emissions, fuel consumption, and power output. As depicted, a plurality of fuel nozzles 34 intakes the fuel 32, mixes the fuel 32 with air, and distributes the air-fuel mixture into the combustor 24. The air-fuel mixture combusts in a combustion chamber within combustor 24, thereby creating hot pressurized exhaust gases. The combustor 24 directs the exhaust gases through a turbine 26 toward an exhaust outlet 36. As the exhaust gases pass through the turbine 26, the gases contact turbine blades attached to turbine rotor disks 38 (e.g., turbine stages). As the exhaust gases travel through the turbine 26, the exhaust gases may force turbine blades to rotate the rotor disks 38. The rotation of the rotor disks 38 induces rotation of shaft 40 and the rotor disks 32 in the compressor 26. A load 42 (e.g., electrical generator) connects to the shaft 40 and uses the rotation energy of the shaft 40 to generate electricity for use by the power grid.

As explained above, the CCPP 10 harvests energy from the hot exhaust gases exiting the gas turbine system 14 for use by the steam turbine system 16 or a boiler. Specifically, the CCPP 10 channels hot exhaust gases 44 from the turbine system 14 into the HRSG 18. In the HRSG 18, the thermal energy in the combustion exhaust gases converts water into hot pressurized steam 46. The HRSG 18 releases the steam in line 46 for use in the steam turbine system 16.

The steam turbine system 16 includes a turbine 48, shaft 50, and load 52 (e.g., electrical generator). As the hot, pressurized steam in line 46 enters the steam turbine 48, the steam contacts turbine blades attached to turbine rotor disks 54 (e.g., turbine stages). As the steam passes through the turbine stages in the turbine 48, the steam induces the turbine blades to rotate the rotor disks 54. The rotation of the rotor disks 54 induces rotation of the shaft 50. As illustrated, the load 52 (e.g., electrical generator) connects to the shaft 50. Accordingly, as the shaft 50 rotates, the load 52 (e.g., electrical generator) uses the rotation energy to generate electricity for the power grid. As the pressurized steam in line 46 passes through the turbine 48, the steam loses energy (i.e., expands and cools). After exiting the steam turbine 48, the steam enters a condenser 49 before being routed back to the HRSG 18, where the steam is reheated for reuse in the steam turbine system 16.

As explained above, the controller 12 enables the CCPP 10 to flexibly load the gas turbine system 14, which may enable increased steam production in the HRSG 18. The controller 12 may also be employed to control the temperature of the exhaust gas provided to the HRSG 18. Additionally, as discussed below, the controller 12 may further be employed to control the amount of compressed air that passes into the turbine 26 via the air lines 78.

Generally, the controller 12 may include a memory 56 and a processor 58. The memory 56 stores instructions and steps written in software code. The processor 58 executes the stored instructions in response to feedback from the CCPP 10. More specifically, the controller 12 controls and communicates with various components in the CCPP 10 in order to flexibly control the loading of the gas turbine system 14, and thus the loading of the steam turbine system 16. As illustrated, the controller 12 controls the airflow control module 20, the intake of fuel 32, the actuators 84 and 94, and the valves 47, 80, and 90. The controller 12 communicates with load 42, exhaust gas temperature sensor 60, HRSG steam temperature sensor 62, and steam turbine metal temperature sensor 64, in order to load the CCPP 10 along different load paths. The controller 12 also communicates with the sensors 82 and 92 in order to make determinations regarding the flow of the air that passes through the valves 80 and 90.

Although the controller 12 has been described as having the memory 56 and the processor 58, the controller 12 may include a number of other computer system components to enable the controller 12 to control the operations of the CCPP 10 and the related components. For example, the controller 12 may include a communication component that enables the controller 12 to communicate with other computing systems. The controller 12 may also include an input/output component that enables the controller 12 to interface with users via a graphical user interface or the like.

With the foregoing in mind, in some embodiments, the controller 12 may monitor airflow via the air lines 78 using the sensors 82 and 92 and control valve positions of the valves 80 and 90 using the actuators 84 and 94. Although not shown, other air lines 78 may be placed in other suitable parts of the CCPP 10, and the controller 12 can control airflow in a similar fashion.

Figure 2:
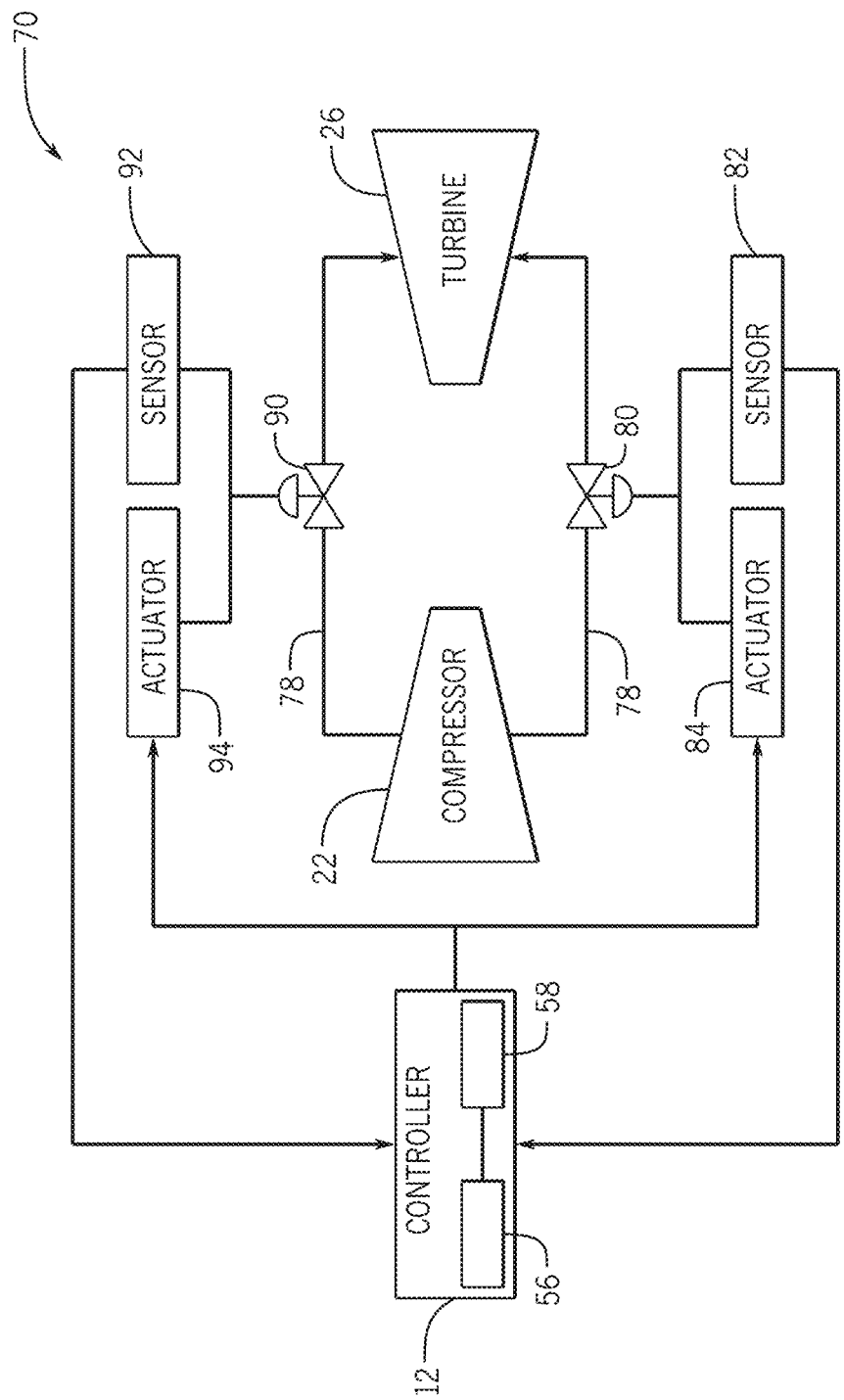
FIG. 2 is a block diagram of a turbine system that employs a controller, sensors, and actuators to control imbalances in airflow between valves on two air lines, in accordance with embodiments described herein.

By way of example, FIG. 2 illustrates a block diagram of a turbine system 70 for controlling an imbalance in airflow between valves 80 and 90. As described above, compressed air may exit the compressor 22 via air lines 78, pass through the valves 80 and 90, and then enter the turbine 26. As illustrated, the valve 80 is coupled to sensor 82 and actuator 84, and the valve 90 is coupled to sensor 92 and actuator 94. The sensors 82 and 92 as well as the actuators 84 and 94 are communicatively coupled to the controller 12. In accordance with the present embodiment, the controller 12 may control the valve positions of the valves 80 and 90 and reduce an airflow imbalance between the valves 80 and 90.

In one embodiment, the controller 12 may control the valves 80 and 90 via processor 58. More specifically, the controller 12 may send signals to the actuators 84 and 94, which in turn adjust the valve positions of the valves 80 and 90, respectively. In other words, the controller 12, via the processor 58, may send a command to the actuator 84 to effect a certain change to the valve 80, and the actuator 84 may physically adjust the valve position of the valve 80 in response to the command. For example, activation of the actuator 84 by the controller 12 may cause the valve position of the valve 80 to open or close by a desired amount. For example, the valves 80 and 90 may be completely open, completely closed, or open or closed to a position between completely open and completely closed. The valve positions of the valves 80 and 90 may be based on several factors, including, but not limited to, ambient temperature, desired energy output, desired airflow from compressor 22 to turbine 26 via the air lines 78, reducing an imbalance between the valves 80 and 90, the valve position of one of the valves 80 or 90, desired efficiency, and the like.

As described above, the controller 12 may also be coupled to the sensors 82 and 92. The sensors 82 and 92 may sense the valve positions of the valves 80 and 90, respectively. In other words, the sensors 82 and 92 sense the percentage to which the valves 80 and 90, respectively, are open or closed. In some embodiments, the sensors 82 and 92 may also sense more than the valve positions of the valves 80 and 90. For example, the sensors 82 and 92 may also be able sense the airflow that passes through the valves 80 and 90. As such, the controller 12 may request and/or receive information from the sensors 82 and 92. For example, the controller 12 may receive feedback on the valve positions of the valves 80 and 90 from the sensors 82 and 92, respectively. As described below, feedback from the sensors 82 and 92 may be used by the controller 12 to make several determinations.

Although only two valves, sensors, and actuators are illustrated in FIG. 2, it should be noted that additional valves, sensors, and actuators may be incorporated into the turbine system 70 or the CCPP 10. For instance, more than one valve, sensor, or actuator may be associated with a particular air line, and additional valves, sensors, and actuators may be disposed throughout the CCPP 10.

Figure 3:
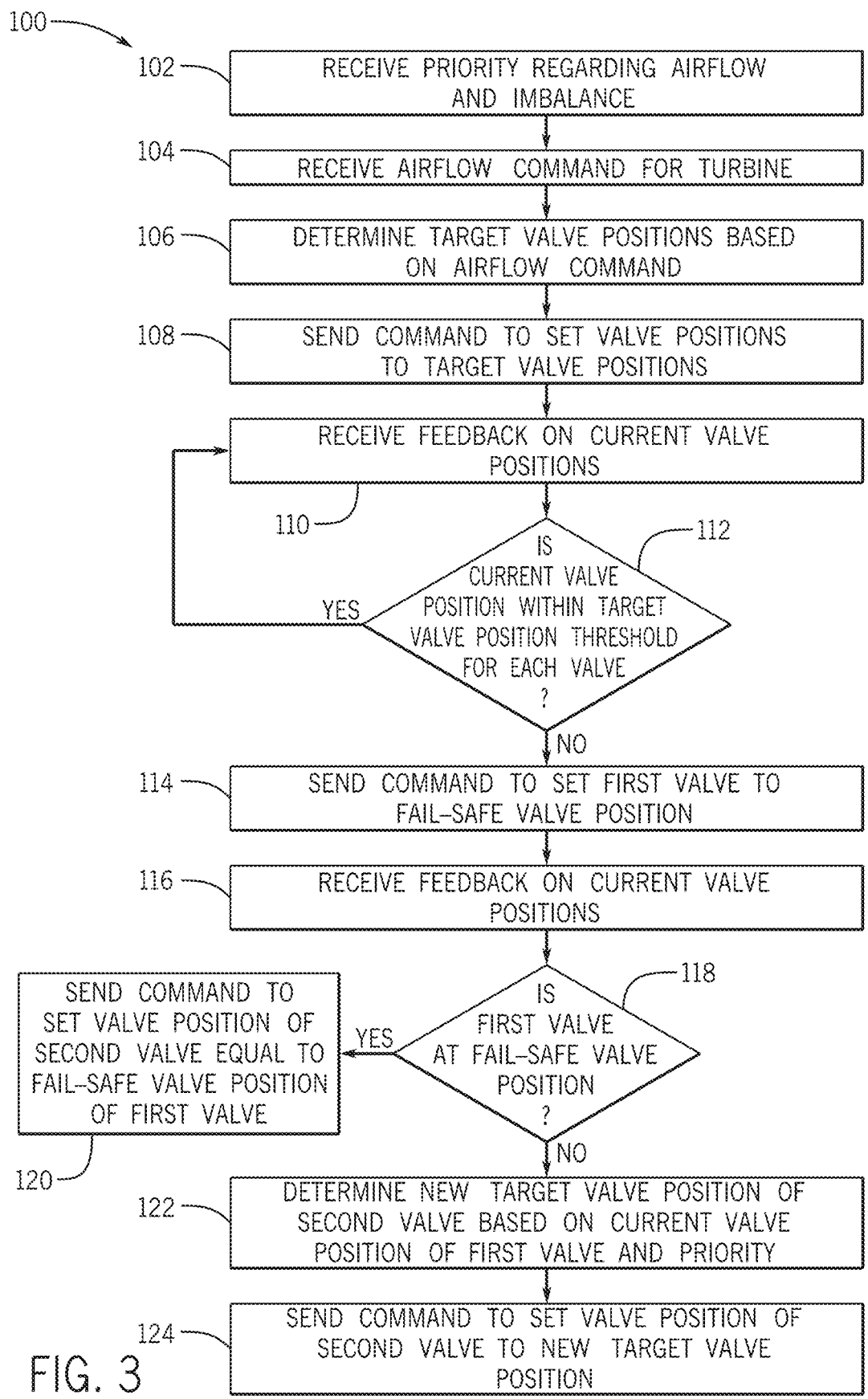
FIG. 3 is a flow chart of a method for reducing an airflow imbalance between two air lines of a turbine system, in accordance with embodiments described herein.

Keeping the foregoing in mind, FIG. 3 illustrates a flow chart of a method 100 employed by the controller 12 to monitor and reduce airflow imbalances between the air lines 78. Although the following description of the method 100 will be described as being performed by the controller 12, it should be noted that the method 100 may be performed by any suitable computing device including a computing device that is remotely positioned with respect to the CCPP 10 or the turbine system 70.

With the foregoing in mind, a method 100 for reducing imbalances in the airflow between the valves 80 and 90 will now be described. Referring now to FIG. 3, at block 102, the controller 12 may receive a priority regarding airflow and airflow imbalance. The priority may reflect a relative importance regarding an airflow that passes through the air lines 78 as compared to reducing an airflow imbalance between the air lines 78. For instance, the priority may assign a weight to the level of importance of each the airflow that passes through the air lines 78 and reducing an airflow imbalance between the air lines 78. However, in other embodiments, the controller 12 may receive a priority regarding a factor or factors other than airflow or airflow imbalance (e.g., desired energy output). More specifically, in the present embodiment, the controller 12 may be instructed by the priority whether to place more importance on maintaining a certain airflow through the air lines 78 to the turbine 26 or on reducing an airflow imbalance between the valves 80 and 90. The controller 12 may also be instructed as to a degree (e.g., weight) one should be favored over the other, if any. For example, maintaining a certain airflow and reducing an airflow imbalance could be given equal or unequal levels of importance. The priority regarding airflow and imbalance may be received in many ways. For example, the priority may be stored on and read from the memory 56 of the controller 12 or received from a user via an interface (e.g., a graphical user interface).

In addition to the priority regarding airflow and an airflow imbalances, at block 104, the controller 12 may receive an airflow command for the turbine 26. For example, the turbine 26 may have a certain operating airflow between the compressor 22 and the turbine 26 via the air lines 78 necessary to keep the turbine 26, and thus the CCPP 10, running. To keep the turbine 26 operating, a command may be given to the controller 12, such that the operating airflow between the compressor 22 and the turbine 26 via the air lines 78 will be achieved. Similar to the priority regarding airflow and airflow imbalances discussed above, the airflow command for the turbine 26 may be received in many ways. For example, the priority may be stored on and read from the memory 56 of the controller 12 or received from a user via an interface (e.g., a graphical user interface).

Turning now to block 106, the controller 12, via the processor 58, may determine target valve positions for the valves 80 and 90 based on the airflow command for turbine 26. For example, the target valve positions of the valves 80 and 90 could be completely open, completely closed, or at a position between completely open and completely closed. Additionally, after determining target valve positions for the valves 80 and 90, at block 108, the controller 12, via the processor 58, may send a command to the actuators 84 and 94 to set the valves 80 and 90, respectively, at the target valve positions. As discussed above, the actuators 84 and 94 are configured to execute commands sent by the controller 12.

At block 110, the controller 12 may receive feedback regarding the current valve positions of the valves 80 and 90 from sensors 82 and 92, respectively. After the controller 12 has received feedback regarding the current valve positions of the valves 80 and 90, at block 112, the controller 12 may determine whether the current valve positions of the valves 80 and 90 are within target valve position thresholds (e.g., +/−5% of the target valve positions) for each of the valves 80 and 90. The target valve position thresholds may be equal or not equal to one another, and the target valve position thresholds may also be independent of or interrelated to one another. Additionally, the target valve position thresholds may be either received or determined by the controller 12. For example, the target valve position thresholds may be stored on and read from the memory 56 of the controller 12, defined by a user via an interface (e.g., a graphical user interface), or determined based on the operating parameters associated with the CCPP 10 (e.g., power output, efficiency, etc.).

If the controller 12 decides that the current valve positions of both of the valves 80 and 90 are within their respective target valve position thresholds, the controller 12 may return to block 110 and continue to receive feedback on the current valve positions of the valves 80 and 90. However, if the controller 12 decides that the current valve position of the valve 80 or the valve 90 is not within its respective target valve position threshold, the controller 12 may proceed to block 114. In other words, in the event the controller 12 determines that the current valve position of one of the valves 80 and 90 is not within its respective target valve position threshold, it is likely that one of the valves 80 and 90 and/or one of the actuators 84 and 94 is not operating properly. Moreover, there may be an airflow imbalance between the air lines 76. For example, if the target valve positions of the valves 80 and 90 were equal to one another, the target valve thresholds of the valves 80 and 90 were also equal to one another, and the current valve position of one of the valves 80 and 90 is not within its target valve position threshold, the valves 80 and 90 would have two different current valve positions. As a result, more air would flow through one of the valves 80 and 90 than the other (i.e., cause an airflow imbalance).

Referring back to block 112, if the current valve position is not within the target valve position threshold, the controller 12 may proceed to block 114. At block 114, the controller 12 may send a command to position the valve 80 or 90 (e.g., a first valve) that is not within its target valve position threshold to its fail-safe valve position. The fail-safe valve position may be a pre-defined valve position. That is, the fail-safe valve position may be a valve position at which a valve is completely open, completely closed, or open or closed to some degree between completely open and completely closed as pre-defined to the controller 12. Additionally, the fail-safe valve position may be stored on and read from the memory 56 of the controller 12 or received from user input via an interface (e.g., a graphical user interface).

At block 116, the controller 12 may again receive feedback on the current valve positions of the valves 80 and 90. After receiving the feedback, at block 118, the controller 12 may decide whether the first valve is currently positioned at its fail-safe valve position. In other words, based on the feedback on the current valve position it receives, the controller 12 may determine whether the first valve that was previously commanded to be set to its fail-safe valve position is actually positioned at its fail-safe valve position.

If the first valve is at its fail-safe valve position, at block 120, the controller 12 may send a command to the actuator 84 or 94 associated with a second valve (i.e., the valve that was not commanded to be set to its fail-safe valve position) to adjust a valve position of the second valve to a different valve position. The adjustment may be based on a selected or preset valve position. For example, the adjustment valve position may be stored on the memory 56 and read by the controller 12, or a valve position may be entered by a user via an interface (e.g., a graphical user interface). In certain embodiments, the controller 12 sends a command to the actuator 84 or 94 associated with the second valve to set the valve position of the second valve equal to the fail-safe valve position of the first valve. However, in other embodiments, the controller 12 may send a command to the actuator 84 or 94 associated with the second valve to set the valve position of the second valve to a different valve position such as, but not limited to, completely open or completely closed.

Conversely, the controller 12 may determine that the first valve does not have a valve position that corresponds to its fail-safe valve position. In such a case, it is possible that the first valve is immobile or that the actuator 84 or 94 associated with the first valve is no longer responsive. With this in mind, if at block 118 the controller 12 determines that the first valve is not at its fail-safe valve position then, at block 122, the controller 12 may determine, via the processor 58, a new target valve position of the second valve based on the current valve position of the first valve, as well as the priority regarding airflow and airflow imbalance discussed above. For example, if the priority placed more importance on reducing an airflow imbalance rather than the amount of airflow, the controller 12 may determine a new target valve position of the second valve that is closer to the current valve position of the first valve. In one embodiment, the new target valve position could be determined using a formula, equation, several formulas or equations, an algorithm, or any combination thereof. For example, the following formulas and equations could be used to determine the new target valve position of the second valve:

$$P=1-A; P=I; A+I=1$$

$$T_2=PV_1$$

where P is priority, A is the importance placed on the amount of airflow, I is the importance placed on reducing an airflow imbalance, $T_2$ is the new target valve position of the second valve, and $V_1$ is the current valve position of the first valve. It should be noted that $V_1$ could be relative to how far open or closed the current valve position of the first valve may be. Expanding on the example in which more importance is placed on the amount of airflow in comparison to reducing an airflow imbalance, I may equal 0.75, and A may equal 0.25. In such a case, P would equal 0.75, and the new target valve position of the second valve, $T_2$, would then be one-fourth of the current valve position of the first valve. For example, if the first valve were completely open, the new target valve position of the second valve would be three-quarters open.

Alternatively, if the priority placed more importance on the amount of airflow rather than reducing an airflow imbalance, the controller 12 may determine a new target valve position of the second valve that is farther from the current valve position of the first valve compared to a priority that places more importance on reducing an airflow imbalance than on the amount of airflow. Using the algorithm described above, I may equal 0.25, and A may equal 0.75. In such a case, P would equal 0.25, and the new target valve position of the second valve, $T_2$, would then be one-fourth of the current valve position of the first valve. For example, if the first valve were completely open, the new target valve position of the second valve would be one-quarter open.

If, the priority placed equal importance on the amount of airflow and reducing an airflow imbalance, the controller 12 may determine a new target valve position that is in between the new target valve positions discussed in the previous two paragraphs. Using the algorithm described above, I may equal 0.5, and A may equal 0.5. In such a case, P would equal 0.5, and the new target valve position of the second valve, $T_2$, would then be one-half of the current valve position of the first valve. For example, if the first valve were completely open, the new target valve position of the second valve would be one-half open.

It is important to understand that the present disclosure is not limited to the examples given above regarding different priorities or the formulas and equations described above used to determine the new target valve position of the second valve. Any suitable manner of assigning an importance to reducing an airflow imbalance or an amount of airflow could be used. Additionally, different formulas, equations, or algorithms could be utilized. For example, an algorithm used to determine the target valve position of the second valve could also take into consideration the operating airflow between the compressor 22 and the turbine 26 via the air lines 78 sufficient to keep the turbine system 70 or the CCPP 10 operational. In such a case, the value of the new target valve position of the second valve may be limited to fall within a range of values in which the operating airflow would be obtained. Furthermore, different equations, formulas, and algorithms could also take other factors into account, such as ambient temperature, desired energy output, desired efficiency, and the like.

After determining the new target valve position of the second valve, at block 124, the controller 12 may to send a command to the actuator 84 or 94 to adjust the valve position of the second valve to its new target valve position.

Technical effects of the presently disclosed systems and techniques include detecting and reducing imbalances between the airflow of the valves 80 and 90 of lines 78. Moreover, by adjusting the valve position of the second valve after the first valve has been commanded to its fail-safe valve position, the controller 12 may prevent overloading the CCPP 10, powering down the CCPP 10, or the like. That is, the CCPP may continue to operate in the event that the first valve has a valve position that is not within the target valve position threshold of the first valve.

This written description uses examples to disclose various embodiments of the presently disclosed systems and techniques, including the best mode, and to enable any person skilled in the art to practice the embodiments, including making and using any devices or systems and performing any incorporated methods. The patentable scope of the presently disclosed systems and techniques is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A turbine system comprising:
a plurality of air lines extending from a compressor to a turbine, wherein the plurality of air lines comprises a plurality of valves, wherein the plurality of valves comprises a first valve and a second valve configured to control airflow via a first air line and a second air line of the plurality of air lines, respectively;
a plurality of sensors configured to couple to the plurality of valves;
a plurality of actuators configured to control the plurality of valves; and
a controller configured to:
determine a first target valve position of the first valve based on an airflow command;
send a first command to a first actuator of the plurality of actuators, wherein the first command is configured to cause the first actuator to set a first valve position of the first valve to the first target valve position;
determine whether the first valve position of the first valve is within a threshold of the first target valve position;
send a second command to the first actuator to set the first valve to a fail-safe valve position when the first valve position of the first valve is not within the threshold, wherein the fail-safe valve position is stored on memory of the controller;
determine whether the first valve position corresponds to the fail-safe valve position;
determine a second target valve position of the second valve based on whether the first valve position corresponds to the fail-safe valve position; and
send a third command to a second actuator of the plurality of actuators to set a second valve position of the second valve based on whether the first valve position corresponds to the fail-safe valve position.

2. The turbine system of claim 1, wherein the plurality of sensors is configured to detect the first valve position of the first valve and the second valve position and transmit the first valve position and the second valve position to the controller.

3. The turbine system of claim 1, wherein the plurality of actuators is configured to adjust the first valve position and the second valve position of the second valve using a first motor and a second motor, respectively.

4. The turbine system of claim 1, wherein the controller is configured to send the first command based at least partially on a priority regarding the airflow through the plurality of air lines and reducing an airflow imbalance via the plurality of air lines.

5. The turbine system of claim 1, wherein the controller is configured to determine a second target valve position of the second valve based on the airflow command.

6. The turbine system of claim 5, wherein the controller is configured to determine whether the second valve position of the second valve is within a second threshold of the second target valve position.

7. The turbine system of claim 1, wherein the first valve position is equal to the second valve position.

8. The turbine system of claim 1, wherein the turbine system comprises a graphical user interface configured to receive a priority regarding the airflow through the plurality of air lines and reducing an airflow imbalance via the plurality of air lines.

9. The turbine system of claim 1, wherein the controller is configured to
send the third command to set the second valve position to the second target valve position in response to the first valve position corresponding to the fail-safe valve position.

10. A non-transitory machine readable medium, comprising computer executable instructions configured to cause a processor to:
determine a first target valve position of a first valve and a second target valve position based on an airflow command associated with a turbine, wherein the first valve and a second valve are coupled to a first air line and a second air line, respectively, wherein the first air line and the second air line are configured to couple a compressor to the turbine;
send a command to an actuator associated with the first valve to set a first valve position of the first valve to the first target valve position;
determine whether the first valve position of the first valve is within a threshold of the first valve;
send a second command to the actuator to set the first valve position of the first valve to a fail-safe valve position when the first valve position of the first valve is not within the threshold, wherein the fail-safe valve position is stored on the non-transitory machine readable medium;
determine whether the first valve position corresponds to the fail-safe valve position;
determine a second target valve position of the second valve based on whether the first valve position corresponds to the fail-safe valve position; and
send a third command to set a second valve position of the second valve based on whether the first valve position corresponds to the fail-safe valve position.

11. The non-transitory machine readable medium of claim 10, wherein the computer executable instructions are configured to cause the processor to determine whether the second valve position of the second valve is within a second threshold of the second target valve position.

12. The non-transitory machine readable medium of claim 10, wherein the computer executable instructions are configured to cause the processor to:
determine a third target valve position of the second valve based on whether the first valve position corresponds to the fail-safe valve position; and
send the third command to set the second valve position to third target valve position.

13. The non-transitory machine readable medium of claim 10, wherein the first valve position is equal to the second valve position.

14. A method, comprising:
determining, via a processor, a first target valve position of a first valve of a plurality of valves associated with a plurality of air lines and a second target valve position of a second valve of the plurality of valves based on an airflow command, wherein the plurality of air lines is configured to couple a compressor section to a turbine section;
sending, via the processor, a first command to a first actuator associated with the first valve to set the first valve to the first target valve position;
receiving, via the processor, a first set of data from a sensor associated with the first valve regarding a first valve position of the first valve;
determining, via the processor, whether the first valve position is within a threshold of the first target valve position;
sending, via the processor, a second command to the first actuator to set the first valve to a fail-safe valve position when the first valve position is not within the threshold, wherein the fail-safe valve position is stored on memory communicatively coupled to the processor;
determining, via the processor, whether the first valve position corresponds to the fail-safe valve position;
determining, via the processor, a second target valve position of the second valve based on whether the first valve position corresponds to the fail-safe valve position; and
sending, via the processor, a third command to a second actuator associated with the second valve to set the second valve to the fail-safe valve position when the first valve position corresponds to the fail-safe valve position.

15. The method of claim 14, comprising:
receiving, via the processor, a priority regarding an airflow through the plurality of air lines and reducing an airflow imbalance via the plurality of air lines; and
determining, via the processor, the first and second target valve positions based on the priority.

16. The method of claim 14, comprising:
sending, via the processor, the third command to the second actuator when the first valve position is determined not to be within the threshold; and
receiving, via the processor, a second set of data from the sensor regarding the first valve position; and
determining, via the processor, whether the first valve position corresponds to the fail-safe valve position based on the second set of data.

17. The method of claim 16, comprising:
determining, via the processor, a third target valve position for the second valve when the first valve position is determined to not correspond to the fail-safe valve position, wherein the third target valve position is different than the fail-safe valve position; and
sending, via the processor, a fourth command to the second actuator to set the second valve position to the third target valve position when the first valve position is determined not to be within the threshold.

18. The method of claim 14, comprising determining, via the processor, the second target valve position based at least partially on a priority regarding an airflow through the plurality of air lines and reducing an airflow imbalance via the plurality of air lines.

19. The method of claim 14, comprising determining, via the processor, the second valve target position based on an ambient temperature.

20. The method of claim 14, comprising determining, via the processor, a new target valve position when the first valve does not correspond to the first target valve position.

* * * * *